Patented Dec. 31, 1946

2,413,493

UNITED STATES PATENT OFFICE 2,413,493

SYNTHESIS OF ISOMER-FREE BENZYL METHYL ACETOACETIC METHYL ESTER

Alvin C. Flisik, Haverstraw, Leonard Nicholl, Nyack, and William P. Bitler, Haverstraw, N. Y., assignors to Kay-Fries Chemicals, Inc., West Haverstraw, N. Y., a corporation of New York No Drawing. Substituted for abandoned application Serial No. 410,575, September 12, 1941. This application June 3, 1943, Serial No. 489,500

4 Claims. (Cl. 260—476)

This invention relates to improvements in the synthesis of isomer-free benzyl methyl acetoacetic methyl ester which is especially suited for use in the preparation of alpha-phenyl-beta-amino propane. This application is a substitute for our application Serial No. 410,575 filed September 12, 1941.

Hitherto, commercial synthesis of this amine involved several steps but with low yields and high material costs. The low yields are due, at least in part, to undesirable side reactions. In the prior art synthesis a multiplicity of reactions has been required to secure the desired product.

It has now been found that the prior art difficulties above enumerated may be essentially avoided by the controlled preparation of a suitable isomer-free intermediate derived from the acetoacetic ester. These conditions involve as a prerequisite the initial formation of a methyl derivative by reacting the ester with a methyl halide, such as the chloride. The methyl residue is joined to the active carbon so that subsequent benzylation can result only in the introduction of the benzyl group in the proper place, and without the formation of isomers which is the characteristic of this reaction when benzylation is first carried out followed by methylation.

The novel procedures of the present invention will permit the securing of a desired product alpha-phenyl-beta-amino propane by reacting the sodium derivative of acetoacetic ester first with methyl halide such as methyl chloride and then reacting the sodium salt of the methyl derivative with benzyl chloride according to the following equations:

(1) 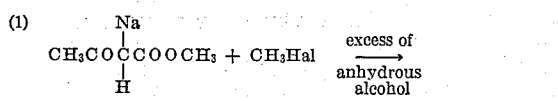

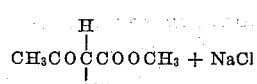

(2) 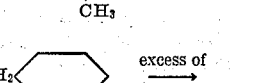

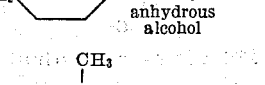

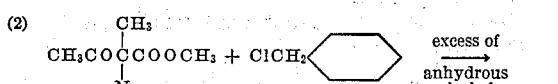

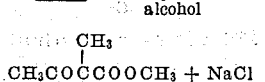

Thus the correct acetoacetic ester derivative must be obtained, and from this product alpha-phenyl-beta-amino propane can be secured. It is found that when the benzyl group is introduced into the acetoacetic ester molecule as a first step, the active hydrogen on the CH₂ group of the benzyl residue is substituted by the methyl group in the next step. In this manner an isomer of alpha-phenyl-beta-amino propane is arrived at. By reversing this procedure according to the present disclosure, and introducing the methyl group first, this methyl group must go on the active carbon of the acetoacetic ester. As a result, when the benzyl group is subsequently introduced into the molecule, there is but one substitution possible, and the correct derivative must be formed. The importance of the correct sequence of steps at this point in the general synthesis procedure is obvious, as the fundamental reactions and their general sequence is standard practice.

By a logical extension of the herein disclosed reaction, the methyl derivative of alpha-phenyl-beta-amino propane could be formed.

(3) 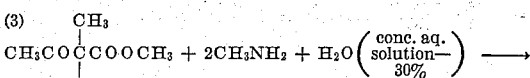

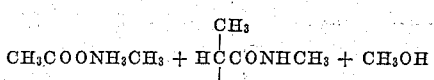

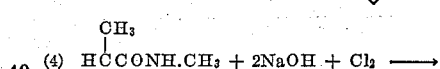

(4) 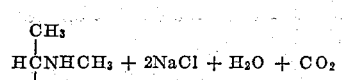

The use of a Hofmann reaction to specifically form alpha-phenyl-beta-amino propane by following the described procedure involving preliminary methylation of acetoacetic acid methyl ester, followed by benzylation of the methylated acetoacetic ester results directly in the formation of the desired product without contamination with isomers. This step permits the use of cheaper raw materials with an accompanying advantage that the yields are higher.

Briefly, the new process involves the methylation of acetoacetic acid methyl ester, and the substitution with zenzyl compounds in the methyl acetoacetic acid methyl ester formed, to form benzyl methyl acetoacetic methyl ester. This benzyl ester is then contacted with aqueous ammonia for several days, with the results that a good yield of benzyl methyl acetamide is obtained. This acetamide is then converted by means of the Hofmann reaction to form alpha-phenyl-beta-amino propane. This amine can also be synthesized by forming benzyl methyl acetoacetic ethyl ester and then cleaving this product with sodium methylate solution to form methyl acetate and benzyl methyl acetic acid methyl ester. The methyl acetate is separated as a constant boiling mixture, after distilling off with the excess methanol. The benzyl methyl acetic acid methyl ester is hydrolyzed with sodium hydroxide solution to form a sodium salt of benzyl methyl acetic acid. The free acid is liberated, then dried and converted to its chloride by means of thionyl chloride. The chloride is converted to benzyl methyl acetamide by reaction with anhydrous ammonia in ether as a solvent. The amide is then converted to alpha-phenyl-beta-amino propane by means of the Hofmann reaction above described.

In the preparation of the alpha-phenyl-beta-amino propane, the following detailed steps were taken and a detailed preparation of the several intermediates identified in the equations hereinabove set out are given.

Methyl methyl aceto acetate 4440 grams of methyl acetate, containing 2% methyl alcohol, was weighed into a 12-liter flask provided with a reflux condenser. 230 grams of sodium metal, in the form of small pieces (approximately ½″ x ½″), was added to the methyl acetate at once. Heat was applied to bring the reaction mixture to refluxing temperature. After eleven hours all of the sodium dissolved. Excess methyl acetate was then distilled from the reaction mixture until all of the constant boiling mixture with methanol distilled off. 5000 cc. of benzol was then added and distillation continued until the last of the methyl acetate was recovered. 1200 grams of dimethyl sulphate was then added over a period of two hours at refluxing temperature. Refluxing was continued until reaction was neutral. The reaction mixture was then cooled to room temperature, and 1400 cc. of water added to dissolve the sodium methyl sulphate. The oil layer was separated, washed with two 1000 cc. portions of water and then fractionated. A yield of 882 grams of methyl methyl aceto acetate was obtained. B. P. 76.0–76.5° C. at 20 mm. 1700 grams of methyl acetate was recovered as constant boiling mixture, balance was recovered with the benzol.

Methyl benzyl methyl aceto acetate 750 grams of methyl methyl aceto acetate, as formed above, and 1690 cc. of methanol were placed in a 3-liter 3-neck flask provided with a reflux. 125 grams of sodium metal was added, a liquid temperature of 50° C. being maintained. The solution of the sodium compound was then added to 657 grams of benzyl chloride contained in a 5-liter flask. Two hours were required for the addition, and the temperature was held between 48–53° C. throughout. After several hours standing, allowing reaction to reach room temperature, a test portion indicated that the reaction was 99.5% complete. Excess alcohol was then distilled off until a liquid temperature of 83° C. was reached. The reaction product was then cooled to 20° C., and 1400 cc. of water was added to dissolve out salt. The oil was shaken with 10% caustic for 10 minutes and then washed with 500 cc. portions of water until neutral. The oil was then fractionated. 165 grams of benzyl chloride was recovered. A yield of 855 grams of methyl benzyl methyl aceto acetate was obtained.

Methyl benzyl acetic acid 855 grams of methyl benzyl methyl aceto acetate from the above run was refluxed with a sodium methylate solution (17 grams Na in 321 cc. methanol) for 3 to 4 hours, and then the constant boiling mixture of methyl acetate-methanol was slowly distilled off in the course of another 1½ hours. The resulting benzyl methyl acetic acid methyl ester was then saponified by the addition of 120 grams of NaOH in the form of 30% aqueous solution. The sodium salt was given two extractions, using 200 cc. of xylol each time. The methyl benzyl acetic acid was liberated from the sodium salt by the addition of 50% $H_2SO_4$ solution. The oil was washed with water, the water washes were combined, extracted with xylene, and then added to the methyl benzyl acetic acid. The xylene was distilled from the acid under vacuum. A yield of 567 grams of methyl benzyl acetic acid was obtained. B. P. 150–155° C. at 8 mm.

Methyl benzyl acetyl chloride 502 grams of thionyl chloride was weighed into a 2-liter 3-neck flask provided with a thermometer, agitator, dropping funnel and reflux condenser. 472 grams of the above described methyl benzyl acetic acid was then added over a period of one hour. The temperature during addition varied between 30–40° C. The excess thionyl chloride was then distilled off, and the acid chloride vacuum distilled. Yield: 420 grams of methyl benzyl acetyl chloride. B. P. 118–120° C. at 15 mm.

Methyl benzyl acetamide 420 grams of methyl benzyl acetyl chloride, formed as above, was converted to the amide by adding the chloride slowly to 4260 cc. of benzol, saturated with $NH_3$ at 200° C., the $NH_3$ always being in excess. After all of the chloride was in the reaction product was heated on a steam bath to 62° C., and the separated out ammonium chloride filtered off. The filtrate was then cooled to 10° C., and the crystals of the benzyl methyl acetamide filtered and dried. Yield: 336 grams methyl benzyl acetamide. Upon recrystallization from benzol there was obtained 286 grams of amide having a M. P. of 108.4° C.

Beta-amino propyl benzene 230 grams of methyl benzyl acetamide, prepared as above, and melting between 107–108.4° C., was added to sodium hypochlorite solution, made by passing 109 grams of chlorine into a solution of 277 grams of sodium hydroxide in 453 cc. of water. The reaction mixture was held at 0° C. for one hour. It was then slowly heated to 18° C., at which point considerable heat was given off and the solid went into solution. The flask, at this stage, had to be immersed in a freezing bath to prevent the temperature from getting too high. After the temperature was under control, the solution was heated to 58° C. whereupon the rearrangement occurred. The heating was continued until 70° C. was reached. The solution was cooled, the oil layer separated and the solution extracted with benzene, using 60 cc. each time. The benzol solution was washed twice with 50 cc. portions of water and 148 grams of concentrated hydrochloric acid slowly added to it. The amine-hydrochloric acid solution was extracted twice with 30 cc. portion of benzol. The amine was then precipitated with sodium hydroxide solution (30%). The water from the precipitated amine was extracted three times with 60 cc. portions of benzol. The benzol solution was washed twice with 100 cc. washes and then vacuum distilled. Yield: 131 grams of purified amine, B. P. 105° C./30 mm., 69.0% of theory.

Results of the ethylation experiments using dimethyl sulfate and methyl iodide indicated that it was possible to get a much greater degree of ethylation using methyl iodide. It was found impossible to get the 108° C. amide by starting from mono benzyl ethyl aceto acetate; however, the 108° C. amide results from introducing the methyl group in ethyl aceto acetate first and then the benzyl group.

Methyl methyl aceto acetate was prepared from methyl acetate in good yields. A large run was made starting with methyl acetate and carrying the synthesis through to the amine. Time tests indicated that methyl benzyl methyl aceto acetate will go over to methyl benzyl acetamide in aqueous ammonia to the extent of approximately 50% in two weeks, standing at room temperature.

*Methyl benzyl acetamide*

100 grams of methyl benzyl methyl aceto acetate is added to 400 cc. of 28-29% aqueous NH4OH and allowed to stand for 7 days. A yield of 50 grams of methyl benzyl acetamide was obtained.

As exemplifying the isomer formation of alpha-amino, beta-phenyl propane, instead of the desired alpha-phenyl, beta-amino propane, the following run was made:

1. First step — preparation of benzyl aceto acetic acid methyl ester: To 1630 grams aceto acetic acid methyl ester there is added 164 grams sodium dissolved in 1200 grams absolute methyl alcohol during 1¼ hours. 15 minutes after the last of the sodium methylate solution has been added, the mixture is added to 932 grams benzyl chloride. The resulting mixture is agitated for 1 hour at 30° C.-47° C., and then heated to refluxing temperature for 1 hour. The excess methanol is distilled off on steam bath. 1800 cc. water are added and the oil which separates washed with water. The oil is distilled when 560 grams aceto acetic acid methyl ester and 1300 grams benzyl aceto acetic acid methyl ester are obtained.

2. Second step—preparation of methyl benzyl aceto acetic acid methyl ester: 184 grams sodium are dissolved in 1340 grams methanol. To this solution of sodium methylate is added 1650 grams benzyl aceto acetic acid methyl ester (from first step). Then there is added immediately 1008 grams dimethyl sulfate in the course of 1½ hours. The reaction mixture is refluxed for 15 minutes after all the dimethyl sulfate is added. Then the excess methanol is distilled off on the water bath. The precipitate formed is dissolved by adding one liter of water. The oil which separates is washed with 500 cc. 10% caustic solution and then with 500 cc. water washes until free of caustic. The oil is then distilled. Yield: 1570 grams methyl benzyl aceto acetic ester.

3. The steps from here on to the preparation of the final amine compound are the same as the corresponding steps in the preparation of the alpha-phenyl-beta-amino propane. That is the steps are in order, cleaving of the methyl benzyl aceto acetic ester, hydrolysis of methyl benzyl acetic acid methyl ester to the corresponding acid; preparation of methyl benzyl acetyl chloride, by reaction of methyl benzyl acetic acid with thionyl chloride, then preparation of the corresponding amide by reaction with ammonia, and finally preparation of the final amine compound from the amide by means of the Hofmann reaction. Now the same shortcut may be taken in this series of reactions as may be taken in the preparation of the alpha-phenyl-beta-amino-propane, that is the amide compound may be prepared directly from the methyl benzyl aceto acetic acid methyl ester by reaction with ammonia, and the amino compound then prepared from the amide by the Hofmann reaction.

Data by which the two isomeric amines can be distinguished:

1. Melting points of the corresponding amines—
    (a) The amide which gives alpha-phenyl-beta-amino-propane, that is, the correct product, has a melting point of 108° C.
    (b) The amide which gives beta-phenyl-alpha-amino-propane, that is the isomer, has a melting point of 70° C.
2. The melting points of the hydrochlorides of the two amines are as follows—
    (a) Melting point of hydrochloride of alpha-phenyl-beta-amino-propane 146°-150° C.
    (b) Melting point of hydrochloride of beta-phenyl - alpha-amino-propane 119°-121° C.
3. The boiling points of the free amines are—
    (a) The alpha-phenyl-beta-amino-propane 205°-206° C.
    (b) The beta-phenyl-alpha-amino-propane 204.2°-204.8° C.

It will now be appreciated that there has been disclosed a novel process for the preparation of alpha-phenyl - beta - amino-propane, substantially free from undesired side reaction products, which desirable result is essentially obtained by ensuring the initial methylation of the active carbon of aceto acetic ester used as a starting material, which may then be followed by benzylation of the methylated compound. As set out in the description of the isomer formation of alpha-amino-beta-phenyl propane, an initial benzylating step precludes the formation of the desired pure isomer-free-intermediate product benzyl methyl acetoacetic methyl ester which is especially suited for use in the preparation of pure alpha-phenyl-beta-amino propane free from its isomer alpha-amino-beta-phenyl propane.

What is claimed is:

1. In the preparation of isomer-free benzyl methyl acetoacetic methyl ester from monosodium acetoacetic methyl ester, the improvements comprising initially reacting stoichiometric amounts of the mono-sodium derivative of acetoacetic methyl ester and methyl halide in an excess of anhydrous alcohol and at temperatures from room temperature up to 90° C., to form methyl methyl acetoacetic acid ester, and then adding the so formed methyl ester to benzyl chloride over a period of two hours while maintaining the temperature of the reacting materials at 48–53° C., then allowing the mixture to stand for several hours to reach room temperature, distilling off excess alcohol until liquid temperature of 83° C. is reached, cooling the residual reaction product including benzyl methyl acetoacetic methyl ester to 20° C., adding excess water to dissolve out salt, purifying the oily reaction product with caustic soltion and water, then fractionating to remove excess benzyl chloride.

2. Process according to claim 1 in which the methyl halide is methyl chloride.

3. In the synthesis of isomer-free benzyl methyl acetoacetic methyl ester from mono-sodium acetoacetic methyl ester, the improvements comprising reacting the mono sodium acetoacetic methyl ester with methyl chloride to form methyl acetoacetic acid ester, forming the sodium salt of the so-formed methyl ester, and then reacting the sodium salt with benzyl chloride.

4. The method of preparing isomer-free benzyl methyl acetoacetic methyl ester, comprising reacting stoichiometrical amounts of methyl chloride and acetoacetic ester sodium salt to form methyl acetoacetic acid ester, purifying the ester and forming its sodium salt, and adding the sodium salt to a methanol solution of benzyl chloride over a two-hour period and at temperatures of 48–53° C.

ALVIN C. FLISIK.
LEONARD NICHOLL.
WILLIAM P. BITLER.